(12) United States Patent
Luo

(10) Patent No.: US 11,045,957 B2
(45) Date of Patent: Jun. 29, 2021

(54) ROBOT CHARACTER SETTING METHOD AND ROBOT

(71) Applicant: CLOUDMINDS (SHENZHEN) ROBOTICS SYSTEMS CO., LTD., Guangdong (CN)

(72) Inventor: Lei Luo, Shenzhen (CN)

(73) Assignee: CLOUDMINDS ROBOTICS CO., LTD., ShangHai (CN)

( * ) Notice: Subject to any disclaimer, the term of this patent is extended or adjusted under 35 U.S.C. 154(b) by 0 days.

(21) Appl. No.: 16/741,326

(22) Filed: Jan. 13, 2020

(65) Prior Publication Data

US 2020/0147807 A1 May 14, 2020

Related U.S. Application Data

(63) Continuation of application No. PCT/CN2017/092879, filed on Jul. 14, 2017.

(51) Int. Cl.
*B25J 11/00* (2006.01)
(52) U.S. Cl.
CPC ................ *B25J 11/0005* (2013.01)
(58) Field of Classification Search
CPC ........... G06N 20/00; G06N 3/04; G06N 3/08; G06N 5/04; G06N 3/0445; G06N 5/022; G06N 3/008; G06F 16/23; G06F 9/5027; G06F 3/0484; G06F 9/54; G06F 11/0721; G16H 50/20; H04L 67/34; H04L 67/42; H04L 47/193; H04L 67/22; H04L 51/046; H04L 67/306; H04L 45/586; G05B 19/042; G05B 19/00; G06K 9/00791; H04R 25/505; Y04S 10/50; Y04S 20/20; Y04S 40/12; Y04S 40/124; H04M 1/7253; H04W 16/225; H04W 68/005; G06T 2207/20081; H04B 7/0417; H04B 7/0621; A47K 5/16; G01R 21/133; G08G 1/164; G10L 15/26; G10L 13/00; G10L 15/285; B25J 9/1697;
(Continued)

(56) References Cited

U.S. PATENT DOCUMENTS 8,996,429 B1 3/2015 Francis, Jr.
9,737,808 B2 * 8/2017 Andre .................. A63F 13/213
(Continued)

FOREIGN PATENT DOCUMENTS

CN 104881108 A 9/2015
CN 106200959 A 12/2016
(Continued)

OTHER PUBLICATIONS

Green et al., Designing for learnability in human-robot communication, 2003, IEEE, pg. (Year: 2003).*
(Continued)

*Primary Examiner* — McDieunel Marc

(57) ABSTRACT

A robot character setting method includes: at a robot: adjusting an attribute value of at least one character attribute in a preset character feature according to feedback from a user, the character feature including a plurality of character attributes, each of the character attributes having an attribute value; and performing an action or speech according to the attribute value of the character attributes in the current character feature.

12 Claims, 6 Drawing Sheets

(58) Field of Classification Search
CPC .... B25J 11/0005; B25J 19/005; B25J 19/023; B25J 9/161
See application file for complete search history.

(56) References Cited

U.S. PATENT DOCUMENTS

| | | | | |
|---|---|---|---|---|
| 2002/0158599 | A1* | 10/2002 | Fujita | G10L 15/26 318/568.11 |
| 2003/0182122 | A1 | 9/2003 | Horinaka et al. | |
| 2014/0181178 | A1* | 6/2014 | Sahoo | G06F 9/505 709/203 |
| 2015/0080125 | A1* | 3/2015 | Andre | A63H 3/50 463/31 |
| 2017/0008521 | A1* | 1/2017 | Braunstein | G01C 21/3602 |
| 2020/0016743 | A1* | 1/2020 | Hosoda | B25J 9/163 |
| 2020/0105265 | A1* | 4/2020 | Kuriya | G10L 25/60 |
| 2020/0364459 | A1* | 11/2020 | Atkinson | G06T 19/006 |
| 2020/0383528 | A1* | 12/2020 | Yang | F04B 43/0063 |

FOREIGN PATENT DOCUMENTS

| | | |
|---|---|---|
| CN | 106503043 A | 3/2017 |
| JP | H1115664 A | 1/1999 |
| JP | 2004174642 A | 6/2004 |
| JP | 2006109923 A | 4/2006 |

OTHER PUBLICATIONS

Ranieri et al., An Emotion-Based Interaction Strategy to Improve Human-Robot Interaction, 2016, IEEE, p. 31-36 (Year: 2016).*
Otero et al., Distribution and Recognition of Gestures in Human-Robot Interaction, 2006, IEEE, p. 103-110 (Year: 2006).*
Austermann et al., Learning to understand multimodal rewards for human-robot-interaction using Hidden Markov Models and classical conditioning, 2008, IEEE, p. 4096-4103 (Year: 2006).*
Saerbeck et al., Design guidelines and tools for creating believable motion for personal robots, 2007, IEEE, p. 386-391 (Year: 2007).*
International Search Report dated Apr. 13, 2018, PCT/CN2017/092879.
1st Office Action dated Mar. 02, 2021 by the JP Office; Appln. No. 2020-501506.

* cited by examiner

ROBOT CHARACTER SETTING METHOD AND ROBOT

CROSS-REFERENCE TO RELATED APPLICATIONS

This application is a continuation of International Application No. PCT/CN2017/092879 with an international filing date of Jul. 14, 2017, the entire contents of which are incorporated herein by reference.

TECHNICAL FIELD

Embodiments of the present application relate to the technical field of artificial intelligence, and in particular, relate to a robot character setting method and apparatus, and a robot.

BACKGROUND

With the development of artificial intelligence, robots bring more convenience for people's production and daily life. The robots are taking an important position in an unprecedented way and speed, and various forms of robots having various functions are being developed.

During the study of the related art, the inventors have found that the related art has at least the following problem: Currently, the appearance, smart degree and character feature of the robots are set when being delivered from factory, and thus the character feature of each robot is fixed. However, the robots are developed for use by different users, and in most situations, the characters of the robots are not to tastes of the users. As a result, user experience is poor.

SUMMARY

An embodiment of the present application provides a robot character setting method. The method includes: at a robot: adjusting an attribute value of at least one character attribute in a preset character feature according to feedback from a user, the character feature including a plurality of character attributes, each of the character attributes having an attribute value; and performing an action or speech according to the attribute value of the character attributes in the current character feature.

Another embodiment of the present application provides a robot. The robot includes: at least one processor; and a memory communicably connected to the at least one processor; wherein the memory stores instructions executable by the at least one processor, wherein, the instructions, when being executed by the at least one processor, cause the at least one processor to perform the steps of: adjusting an attribute value of at least one character attribute in a preset character feature according to feedback from a user, the character feature including a plurality of character attributes, each of the character attributes having an attribute value; and performing an action or speech according to the attribute value of the character attributes in the current character feature.

Still another embodiment of the present application provides a non-volatile computer-readable storage medium. The computer-readable storage medium stores computer-executable instructions, which, when being executed by a robot, cause the robot to perform the steps of: adjusting an attribute value of at least one character attribute in a preset character feature according to feedback from a user, the character feature including a plurality of character attributes, each of the character attributes having an attribute value; and performing an action or speech according to the attribute value of the character attributes in the current character feature.

BRIEF DESCRIPTION OF THE DRAWINGS

One or more embodiments are illustrated by way of example, and not by limitation, in the figures of the accompanying drawings, wherein components having the same reference numeral designations represent like components throughout. The drawings are not to scale, unless otherwise disclosed.

DETAILED DESCRIPTION

For clearer descriptions of the objectives, technical solutions and advantages of the embodiments of the present application clearer, the technical solutions according to the embodiments of the present application are clearly and thoroughly described with reference to the accompanying drawings of the embodiments of the present application. The described embodiments are merely exemplary ones, but are not all the embodiments of the present application. Based on the embodiments of the present application, all other embodiments derived by persons of ordinary skill in the art without any creative efforts shall fall within the protection scope of the present application.

Figure 1:
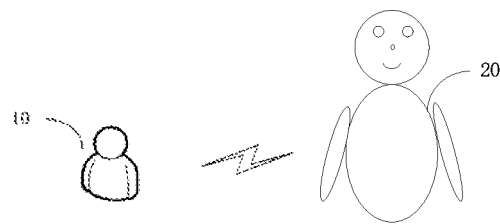
FIG. 1 is a schematic diagram of an application scenario of a method and an apparatus according to the present application.
Figure 2:
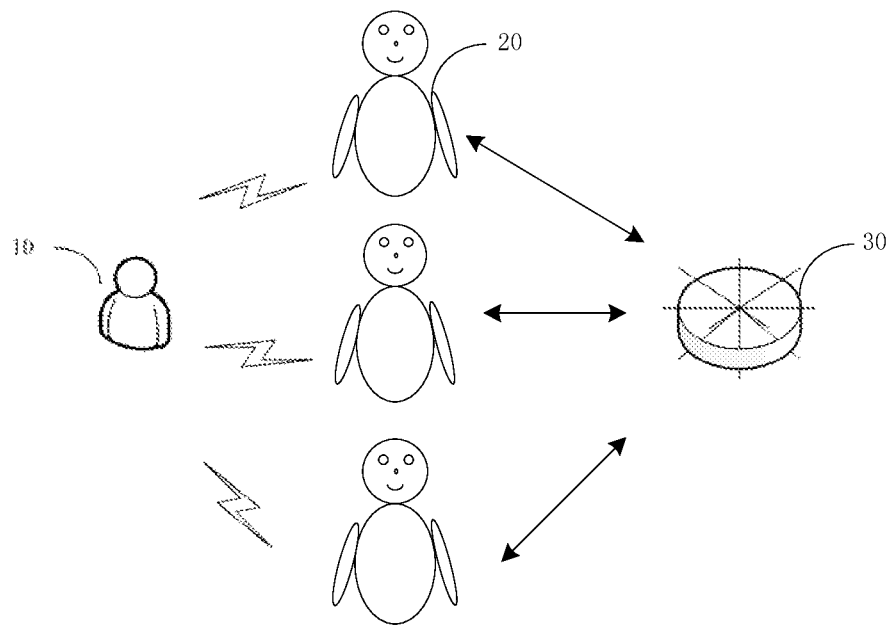
FIG. 2 is a schematic diagram of an application scenario of a method and an apparatus according to the present application.

A robot character setting method and apparatus according to the present application are applicable to application scenarios as illustrated in FIG. 1 and FIG. 2, which include a user 10 and one or a plurality of robots 20 (FIG. 1 illustrates a scenario of only one robot, and FIG. 2 illustrates a scenario of a plurality of robots). As illustrated in FIG. 2, the plurality of servers 20 may communicate with each other over a network 30, wherein the network 30 may be a home or company local area network, or a specific network or the like. The robot 20 includes at least one network interface to establish a communication connection to the network 30, such that data or instructions may be acquired from the network 30. The user 10 may set the plurality of robots 20, issue commands to the plurality of robots 20 or talk with the plurality of robots 20.

Each robot 20 has a character feature which may be preset when being delivered from factory or may be defined by the user 10 from a plurality of preset character features. The robot 20 may set the character feature according to an instruction from the user 10, or the robot 20 may select one character feature from the plurality of preset character features and set the selected character feature as the character feature thereof.

When the character feature is selected from the plurality of preset character features and set as the character feature of the robot by the user 10 or the robot 20, the plurality of character features may be preset during delivery from factory, or may be downloaded from a cloud after delivery from factory. The character feature includes a plurality of character attributes. Each character attribute has an attribute value, and the category of the character attribute may be constantly refined during an update process. The more defined, the more precise the description of the character. The character feature may be structured as follows:

```
struct
{
openness (0-10);
talking proactivity (0-10)
activity (0-10);
consideration (0-10);
dependence (0-10);
temper (0-10);
......
}.
For example, a character feature 1 may be configured as follows:
{
openness: 4;
talking proactivity: 4;
activity: 2;
consideration: 10;
dependence: 5;
temper: 1
}.
For example, a character feature 2 may be configured as follows:
{
openness: 6;
talking proactivity: 7;
activity: 3;
consideration: 3;
dependence: 0;
temper: 8
}.
```

The openness, talking proactivity or activity indicates a category of the character attribute, and the numerical value indicates an attribute value of the category of the character attribute.

After a character feature is set for the robot 20, the attribute value of the character feature may be adjusted according to feedback from the user 10. For example, the character feature 2 is set for the robot 20, a temper value in the character feature 2 is 8, and the user 10 complains that the robot 20 is hot tempered and desires the robot to be mild. In this situation, the robot 20 adjust the temper value thereof to be 6, but the user 10 is still not satisfied, and thus the robot 20 continues to adjust the temper value to be 4.

The attribute value of the character attribute may be adjusted by the robot 20 according to an instruction from the user 10, or the robot 20 may determines that adjustment is needed according to a voice command or conversation content of the user 10, and thus adjust the attribute value of the character attribute.

By adjusting the attribute value of the character attribute according to the feedback from the user, the robot may acquire a character preferred by the user. That is, the character of the robot may be set according to the preference of the user, and thus user experience is improved.

It should be noted that although FIG. 1 only illustrates one user 10 and one robot 20, and FIG. 2 only illustrates one user 10 and three robots 20, a person skilled in the art may understand that in implementation, the applicant scenario may include more users 10 and robots 20.

Figure 3:
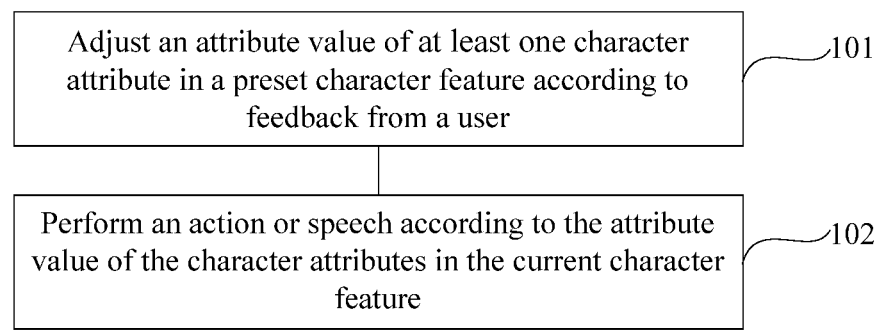
FIG. 3 is a flowchart of a character setting method according to an embodiment of the present application.

An embodiment of the present application provides a robot character setting method. The method may be performed by any robot 20 as illustrated in FIG. 1 or FIG. 2. As illustrated in FIG. 3, the method includes the following steps:

Step 101: An attribute value of at least one character attribute in a preset character feature is adjusted according to feedback from a user, wherein the character feature includes a plurality of character attributes, and each of the character attributes has an attribute value.

In some embodiments of the method, the method further includes:

the step of presetting the character feature, wherein presetting the character feature includes:

selecting a character feature from a plurality of predefined character features; and setting the selected character feature as the character feature of the robot.

The preset character feature of the robot 20 may be selected in advance from a plurality of preset character features and then set, wherein the character feature may be selected by the user, and then the robot sets the character feature according to a selection instruction from the user. Alternatively, the robot may select a character feature and set the character feature thereof. The preset character feature of the robot may be set when being delivered from factory.

The attribute value of the character attribute may be adjusted by the robot according to the instruction from the user. For example, the user directly operates on the screen (which may be the screen of the robot, or may be a remote screen, for example, a mobile phone or tablet computer or the like of the user) to adjust the attribute value of the character attribute, for example, adjusting the consideration from 3 to 8. Alternatively, the robot may also adjust the attribute value of the character attribute according to the feedback from the user. The feedback from the user may be a voice command or conversation content of the user. For example, the user issues a voice command "Rachel, adjust the character to be milder", "Amanda, decrease the temper" or the like. Alternatively, the user speaks to the robot "You are so noisy, please keep quiet", "It's none of your business, I can manage it", or the like. Alternatively, in talking with others, the user mentions that "Rachel is too hot tempered", "Amanda speaks too much" or the like. In this situation, the robot may parse from the semantic understanding that the user is not satisfied with a character attribute (or several character attributes) in the current character settings, and thus the robot may correspondingly modify the attribute value of the character attribute.

Step 102: An action or speech is performed according to the attribute value of the character attributes in the current character feature.

When the character feature setting is different, the behaved action and language are also different. The robot no longer gives answers mechanically, but makes responses complying with the set character features according to the set attribute values. For example, in a scenario where a small temper is required, the robot behaves gently and speaks mildly, and when the attribute value of the temper increases, the robot acts with a larger amplitude and speaks loudly. In a scenario where a low activity is required, the robot answers questions of the user briefly, and when the attribute value of the activity increases, the robot speaks much more during answering the same question. In a scenario where a low talking proactivity is required, the robot may not proactively talk with the user, and when the attribute value of the talking proactivity increases, the robot may more frequently proactively talk with the user.

In the character setting method according to the embodiment of the present application, the attribute value of the character attribute is adjusted according to the feedback from the user, and the corresponding action or speech is performed according to the attribute value of the character attribute in the current character feature. In this way, the robot may proactively cater for the preference of the user, and then gradually develops the character preferred by the user, such that user experience is improved.

Figure 4:
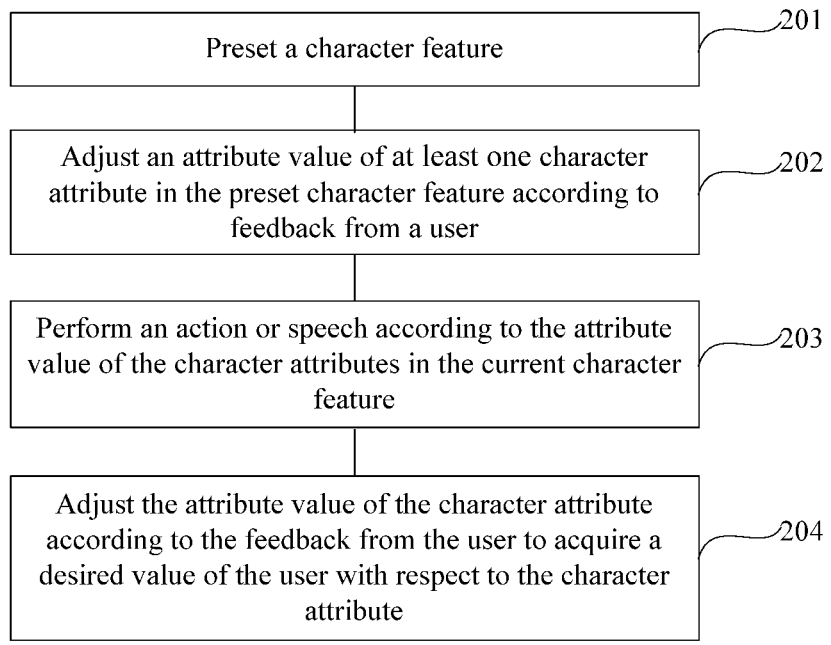
FIG. 4 is a flowchart of a character setting method according to an embodiment of the present application.

Optionally, as illustrated in FIG. 4, in other embodiments of the method, in addition to steps 201, 202 and 203 (for details of steps 201, 202 and 203, reference may be made to the above embodiment), the method further includes the following steps:

Step 204: The attribute value of the character attribute is adjusted, and a desired value of the user with respect to a character attribute is acquired.

Acquiring the desired value of the user with respect to a character attribute is intended to acquire the character of the robot that is preferred by the user, such that reference is provided for the user or other newly joined robots. This is because, for most users, they have no idea what character they really like, or the character they appear to like is not the character they really like. After the user clearly know the character of the robot that he or she likes, when a new robot joins, the user may directly set the character according to his or her preference. Alternatively, when a new robot joins, the other robots broadcast their desired values of the user with respect to the character attributes thereof to the newly joined robot, and the newly joined robot may directly sets the attribute values of the character attributes thereof according to the desired values of the user with respect to the character attributes. In this way, the character preferred by the user may be acquired with no need of adjusting the newly joined robot, and thus user experience is further improved.

Figure 5:
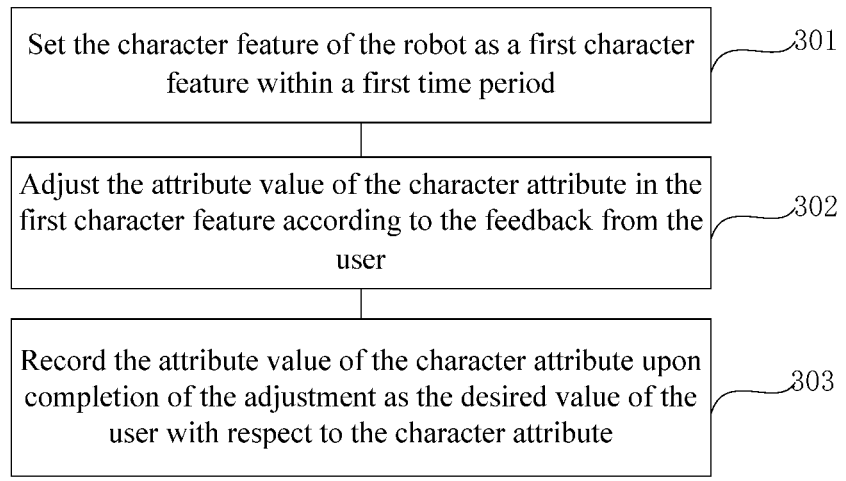
FIG. 5 is a schematic flowchart of acquiring a desired value of a user with respect to a character attribute in the character setting method according to an embodiment of the present application.

Specifically, as illustrated in FIG. 5, in some embodiments of the method, the desired value of the user with respect to the character attribute may be acquired by a unidirectional convergence method. The method includes the following steps:

Step 301: The character feature of the robot is set as a first character feature within a first time period.

Step 302: The attribute value of the character attribute in the first character feature is adjusted according to the feedback from the user.

Step 303: The attribute value of the character attribute upon completion of the adjustment is recorded as the desired value of the user with respect to the character attribute.

Within a time period, the character features of the robot are set to the same character feature (for example, the character feature 2 as described above), and with respect to one or several character attributes, the attribute value of the character attribute is constantly adjusted according to the feedback from the user until the user is satisfied. For example, with respect to the character attribute 2, the user complains that the robot is too hot tempered during use, and expects that the robot is mild. In this situation, the robot determines that the user expects the temper value to be adjusted to 6. However, in subsequent two days, the user is still not satisfied, and hence the robot continues to adjust the temper value to 4. Afterwards, the user does not complain any more. The robot records the desired value of the user with respect to the attribute of the temper as 4. For details of the feedback from the user, reference may be made to the interpretation in the embodiment as illustrated in FIG. 3, which are not described herein any further.

Figure 6:
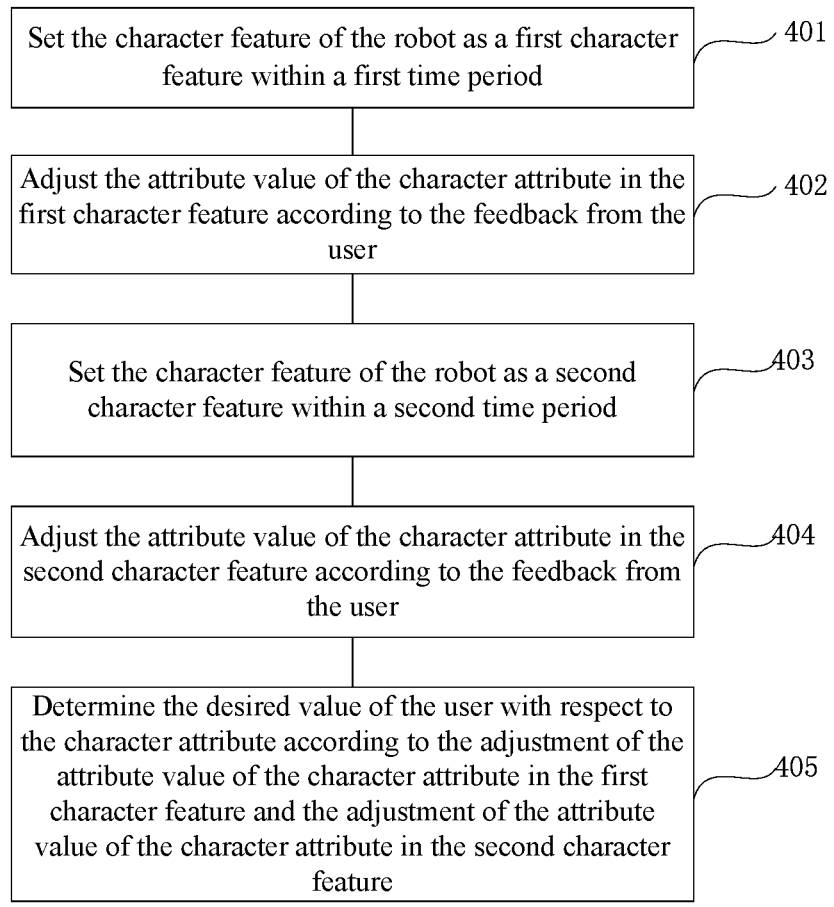
FIG. 6 is a schematic flowchart of acquiring a desired value of a user with respect to a character attribute in the character setting method according to an embodiment of the present application.

Specifically, as illustrated in FIG. 6, in other embodiments of the method, the desired value of the user with respect to the character attribute may be acquired by a bidirectional convergence method. The method includes the following steps:

Step 401: The character feature of the robot is set as a first character feature within a first time period.

Step 402: The attribute value of the character attribute in the first character feature is adjusted according to the feedback from the user.

Step 403: The character feature of the robot is set as a second character feature within a second time period.

Step 404: The attribute value of the character attribute in the second character feature is adjusted according to the feedback from the user.

Step 405: The desired value of the user with respect to the character attribute is determined according to the adjustment of the attribute value of the character attribute in the first character feature and the adjustment of the attribute value of the character attribute in the second character feature.

That is, within two different time periods, the robot is set to have different character features respectively (for example, the character feature 1 and the character feature 2). Within each of the time periods, with respect to one or several character attributes, the attribute value of the character attribute is constantly adjusted until the user is satisfied.

The adjustment of the attribute value of the character attribute in the first character feature and the adjustment of the attribute value of the character attribute in the second character feature may cause the attribute values of the character attributes to tend to be the same value, that is, an absolute value of a difference between the attribute value of the character attribute in the first character feature and the attribute value of the character attribute in the second character feature becomes smaller, and a final difference may be less than a preset threshold (for example, less than 3 or less than 2). This indicates that the attribute value is converged to a small range. In this situation, the small range may be taken as the desired value of the user with respect to the character attribute. However, adjustment orientations of the attribute values of the character attributes are not consistent or the adjustments fail to cause the attribute values to tend to be the same value. This is because, in implementation, some users may prefer more than one character feature, for example, they not only like the active character, but also like the quiet character. In this situation, the character feature preferred by the user and the desired value of the user with respect to the character attribute that is dedicated for the character feature need to be respectively stored and recorded.

The bidirectional convergence method is employed. That is, the same character attribute is adjusted under different character features, and the convergence speed is higher and the accuracy is improved.

The step of determining the desired value of the user with respect to the character attribute according to the adjustment of the attribute value of the character attribute in the first character feature and the adjustment of the attribute value of the character attribute in the second character feature specifically includes:

if the adjustment of the attribute value of the character attribute in the first character feature and the adjustment of the attribute value of the character attribute in the second character feature cause an absolute value of a difference between the attribute value of the character attribute in the first character feature and the attribute value of the character attribute in the second character feature to become smaller, and the absolute value upon completion of the adjustment is less than a preset threshold, recording a value range as the desired value of the user with respect to the character attribute, wherein the value range has two end values, one of the end values is the attribute value of the character attribute in the first character feature upon completion of the adjustment, and the other of the end values the attribute value of the character attribute in the second character feature upon completion of the adjustment;

for example, the preset threshold is 2, and in the first week, the user sets the robot to have the character feature 1 (the attribute value of the temper is 1), during use, the user desires the robot to be slightly tempered and thus seems to be lovely, the robot determines that the user expects that the attribute value of the temper of the robot is adjusted to 3, and thus makes some adjustments; and upon the adjustments, the user does not complain about this any more; in the second week, the user sets the robot to have the character feature 2 (the attribute value of the temper is 8), the user complains that the robot is too hot tempered and desires the robot to be slightly mild; in this situation, the robot determines that the user expects that the attribute value of the temper is adjusted to 6; however, the user is still not satisfied in the subsequent two days; therefore, the robot continues to adjust the attribute value of the temper to 4 (the absolute value of the difference between the attribute values becomes smaller, and the final difference is less than 2); afterwards, the user does not complain any more; based on these two character feature settings, it may be determined that the desired value of the user with respect to the temper is 3 to 4;

if the adjustment of the attribute value of the character attribute in the first character feature and the adjustment of the attribute value of the character attribute in the second character feature cause an absolute value of a difference between the attribute value of the character attribute in the first character feature and the attribute value of the character attribute in the second character feature to become greater, and the absolute value upon completion of the adjustment is greater than or equal to a preset threshold, recording the attribute value of the character attribute in the first character feature upon completion of the adjustment as the desired value of the user that is dedicated for the character attribute of the first character feature, and recording the attribute value of the character attribute in the second character feature upon completion of the adjustment as the desired value of the user that is dedicated for the character attribute of the second character feature;

for example, an initial value of the activity in the first character feature (assuming that the first character feature is the character feature 1) is 2, and an initial value of the activity in the second character feature (assuming that the second character feature is the character feature 2) is 3, and upon several adjustments, the attribute value of the activity in the first character feature changes to 4, and the attribute value of the activity in the second character feature changes to 2; in this situation, the absolute value between the difference between the attribute value of the activity in the character feature 1 and the attribute value of the activity in the character feature 2 upon the adjustments is 2, the absolute value of the difference between the attribute value in the character feature 1 and the attribute value in the character feature 2 prior to the adjustments is 1, and the difference becomes larger; in this situation; the desired value of the user with respect to the activity that is dedicated for the character feature 1 is recorded as 4, and the desired value of the user with respect to the activity that is dedicated for the character feature 2 is recorded as 2; still for example, an initial value of the temper in the character feature 1 is 1, an initial value of the temper in the character feature 2 is 8, and upon several adjustments, the attribute value of the temper in the character feature 1 is still 1, and the attribute value of the temper in the character feature 2 is changed to 7; although the absolute value of the difference becomes smaller, the absolute value of the difference is greater than a preset threshold 2; this indicates that the attribute value fails to converge to a specific range upon a long period of time; that is, the user prefers two characters, and these two characters need to be respectively recorded.

It should be noted that the first character feature and the second character feature are only intended to illustrate that different character features are employed within different time periods, but are not intended to particularly indicate a specific character feature. In addition to the character feature 1 and the character feature 2, other different character features may also be employed.

Optionally, for further increasing a convergence speed of the desired value, in other embodiments of the method, the step of adjusting the attribute value of the character attribute to acquire the desired value of the user with respect to the character attribute further includes:

broadcasting the desired value of the user with respect to each character attribute;

acquiring a desired value of each character attribute sent by other robots; and if the desired values of different users with respect to the same character attribute have an intersection, taking the intersection as a new desired value of the user with respect to the character attribute.

If a plurality of robots are active in the same local area network, each of the robots may broadcast the desired value of the user with respect to each of the character attributes to other robots. When the desired values of the user with respect to the same character attribute of different robots have an intersection, the intersection may be taken as a more accurate desired value of the user with respect to the character attribute. For example, one robot determines that the user may prefer an attribute value of the temper which is in the range of 1 to 2, and another robot determines that the user may prefer an attribute value of the temper which is in the range of 2 to 3; and in this situation, the desired value of the user with respect to the temper may be determined as 2 according to an intersection between the two value ranges. Such network sharing mechanism may greatly increase the convergence speed of character analysis.

Optionally, to increase the convergence speed of the user desired value, in two judgments by the same robot, if the desired values of the user with respect to the same character attribute have an intersection, that is, if the same character feature has more than two user desired values, and different desired values of the user with respect to the same character attribute have an intersection, the intersection is taken as a new desired value of the user with respect to the character attribute.

For example, the robot is set to have the character feature 1 within a first time period and is set to have the character feature 2 within a second time period, and by adjustments of the attribute value of the temper according to the feedback from the user, the desired value of the user with respect to the temper is determined as 1 to 2 by bidirectional convergence within the first time period and the second time period. The robot is set to have a character feature 3 within a third time period and is set to have a character feature 4 within a fourth time period, and by adjustments of the attribute value of the temper according to the feedback from the user, the desired value of the user with respect to the temper is determined as 2 to 3 by bidirectional convergence within the third time period and the fourth time period. That is, the desired values of the user with respect to the temper are two value ranges of 1 to 2 and 2 to 3. These two value ranges have an intersection of 2. In this situation, the intersection 2 is taken as a new desired value of the user with respect to the temper.

Optionally, in other embodiments of the method, the method further includes:

setting the attribute value of the character attribute according to the desired value of the user with respect to the character attribute;

or outputting the desired value of the user with respect to the character attribute.

That is, upon acquiring the desired value of the user with respect to the character attribute, the robot may output the desired value to the user, such that reference is provided for the user to set the character feature of the robot. Alternatively, the robot may broadcast the desired value of the user with respect to the character attribute to other robots originally present in the local area network or a newly joined robot. Upon receiving the desired value, the other robots may set the corresponding attribute values of the character attribute in the character features thereof according to the received desired value. For example, if the robot receives a desired value of the user with respect to the consideration which is in the value range of 7 to 9, the robot may directly set the attribute value of the consideration thereof to be 8.

Optionally, in other embodiments of the method, the method further includes:

acquiring the current character feature;

setting the attribute value of the character attribute according to the desired value of the user that is dedicated for the character attribute of the current character feature if the desired value of the user that is dedicated for the character attribute of the current character feature is present; and otherwise, setting the attribute value of the character attribute according to the desired value of the user with respect to the character attribute.

Upon acquiring a desired value of the user with respect to the character attribute that is dedicated for the character feature, the robot may output the desired value to the user, or may broadcast the desired value to the other robots originally present in the local area network or the newly joined robot. If the other robots simultaneously receive the desired value of the user with respect to the character attribute that is dedicated for the character feature, and the desired value of the user with respect to the attribute feature (which is not dedicated to a character feature), the robots may firstly judge the current character feature thereof. If the current feature includes the desired value of the user that is dedicated for the character attribute, the corresponding attribute value of the character attribute is set according to the desired value of the user with respect to the character attribute that is dedicated to the current character feature. If the current feature does not include the desired value of the user that is dedicated for the character attribute, the corresponding attribute value of the character attribute is set according to the desired value of the user with respect to the character attribute.

Figure 7:
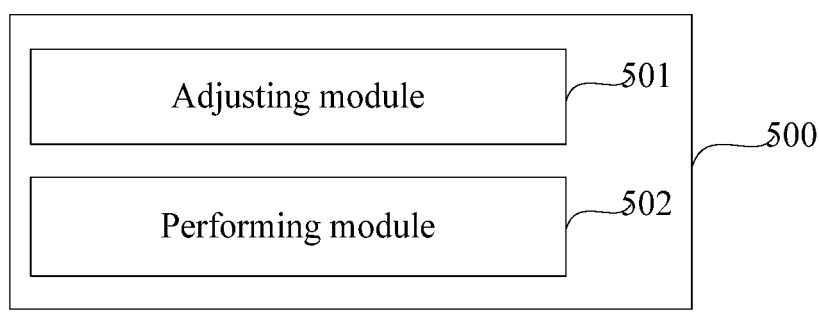
FIG. 7 is a schematic structural diagram of a character setting apparatus according to an embodiment of the present application.

Correspondingly, an embodiment of the present application further provides a robot character setting apparatus 500. The apparatus is arranged in any robot as illustrated in FIG. 1 or FIG. 2. As illustrated in FIG. 7, the apparatus includes:

an adjusting module 501, configured to adjust an attribute value of at least one character attribute in a preset character feature according to feedback from a user, the character feature including a plurality of character attributes, each of the character attributes having an attribute value; and a performing module 502, configured to perform an action or speech according to the attribute value of the character attributes in the current character feature.

In the character setting method according to the embodiment of the present application, the attribute value of the character attribute is adjusted according to the feedback from the user, and the corresponding action or speech is performed according to the attribute value of the character attribute in the current character feature. In this way, the robot may proactively cater for the preference of the user, and then gradually develops the character preferred by the user, such that user experience is improved.

Figure 8:
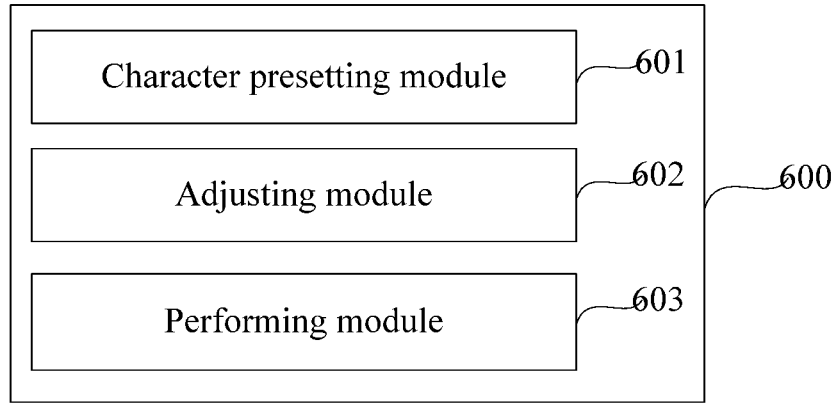
FIG. 8 is a schematic structural diagram of a character setting apparatus according to an embodiment of the present application.

Optionally, as illustrated in FIG. 8, in other embodiments of the apparatus, in addition to the adjusting module 602 and the performing module 603, the apparatus further includes:

a character presetting module 601, configured to preset the character feature;

wherein the character presetting module is configured to:

select a character feature from a plurality of predefined character features; and set the selected character feature as the character feature of the robot.

Figure 9:
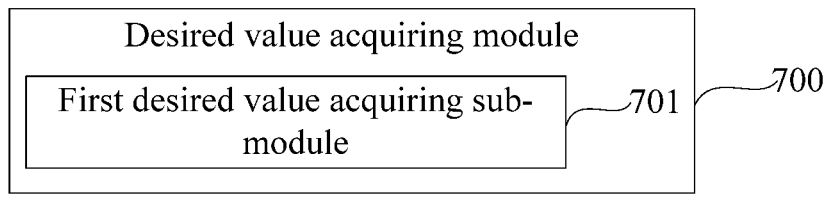
FIG. 9 is a schematic structural diagram of a desired value acquiring module in the character setting apparatus according to an embodiment of the present application.

Optionally, referring to FIG. 9, in other embodiments of the apparatus, the apparatus further includes:

a desired value acquiring module 700, configured to adjust the attribute value of the character attribute to acquire a desired value of the user with respect to the character attribute.

Specifically, referring to FIG. 9, the desired value acquiring module 700 includes a first desired value acquiring sub-module 701, configured to:

set the character feature of the robot as a first character feature within a first time period;

adjust the attribute value of the character attribute in the first character feature according to the feedback from the user; and record the attribute value of the character attribute upon completion of the adjustment as the desired value of the user with respect to the character attribute.

Figure 10:
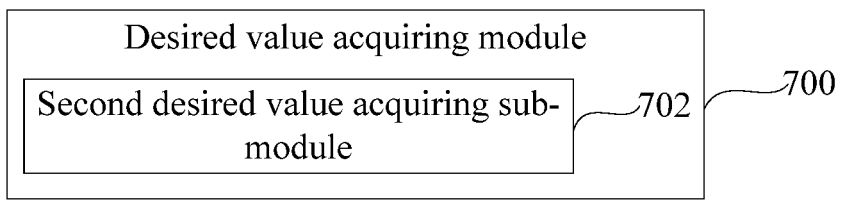
FIG. 10 is a schematic structural diagram of a desired value acquiring module in the character setting apparatus according to an embodiment of the present application.

Optionally, referring to FIG. 10, in other embodiments of the apparatus, the desired value acquiring module 700 includes a second desired value acquiring sub-module 702, configured to:

set the character feature of the robot as a first character feature within a first time period;

adjust the attribute value of the character attribute in the first character feature according to the feedback from the user;

set the character feature of the robot as a second character feature within a second time period;

adjust the attribute value of the character attribute in the second character feature according to the feedback from the user; and determine the desired value of the user with respect to the character attribute according to the adjustment of the attribute value of the character attribute in the first character feature and the adjustment of the attribute value of the character attribute in the second character feature.

Optionally, in other embodiments of the apparatus, the second desired value acquiring sub-module 702 is further configured to:

if the adjustment of the attribute value of the character attribute in the first character feature and the adjustment of the attribute value of the character attribute in the second character feature cause an absolute value of a difference between the attribute value of the character attribute in the first character feature and the attribute value of the character attribute in the second character feature to become smaller, and the absolute value upon completion of the adjustment is less than a preset threshold, record a value range as the desired value of the user with respect to the character attribute, wherein the value range has two end values, one of the end values is the attribute value of the character attribute in the first character feature upon completion of the adjustment, and the other of the end values the attribute value of the character attribute in the second character feature upon completion of the adjustment.

Optionally, in other embodiments of the apparatus, the second desired value acquiring sub-module 702 is further configured to:

if the adjustment of the attribute value of the character attribute in the first character feature and the adjustment of the attribute value of the character attribute in the second character feature cause an absolute value of a difference between the attribute value of the character attribute in the first character feature and the attribute value of the character attribute in the second character feature to become greater, and the absolute value upon completion of the adjustment is greater than or equal to a preset threshold, record the attribute value of the character attribute in the first character feature upon completion of the adjustment as the desired value of the user that is dedicated for the character attribute of the first character feature, and record the attribute value of the character attribute in the second character feature upon completion of the adjustment as the desired value of the user that is dedicated for the character attribute of the second character feature;

Optionally, in other embodiments of the apparatus, the second desired value acquiring sub-module 702 is further configured to:

broadcast the desired value of the user with respect to each character attribute;

acquire a desired value of each character attribute sent by other robots; and if the desired values of different users with respect to the same character attribute have an intersection, take the intersection as a new desired value of the user with respect to the character attribute.

Optionally, in other embodiments of the apparatus, the second desired value acquiring sub-module 702 is further configured to:

if the same character attribute has more than two desired values, and different desired values of the same character attribute have an intersection, take the intersection as a new desired value of the user with respect to the character attribute.

Optionally, in other embodiments of the apparatus, the step of adjusting the attribute value of the character attribute according to the feedback from the user performed by the desired value acquiring module 700 includes:

adjusting the attribute value of the character attribute according to a voice command or conversation content of the user; and adjusting the attribute value of the character attribute according to an instruction from the user.

Figure 11:
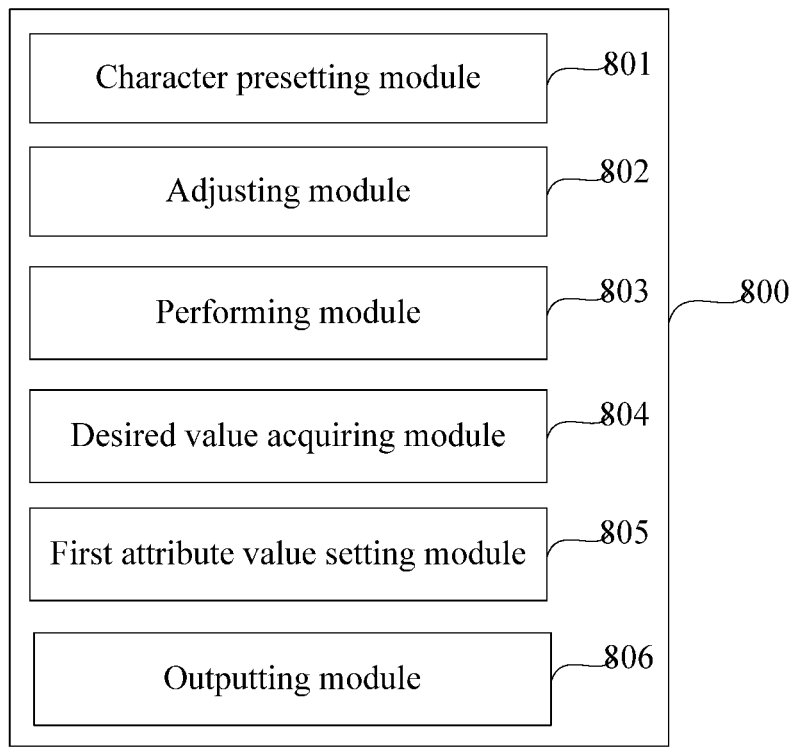
FIG. 11 is a schematic structural diagram of a character setting apparatus according to an embodiment of the present application.

Optionally, as illustrated in FIG. 11, in other embodiments of the apparatus, in addition to the character presetting module 801, the adjusting module 802, the performing module 803 and the desired value acquiring module 804, the apparatus 800 further includes:

a first attribute setting module 805, configured to set the attribute value of the character attribute according to the desired value of the user with respect to the character attribute;

and/or an outputting module 806, configured to output the desired value of the user with respect to the character attribute.

Figure 12:
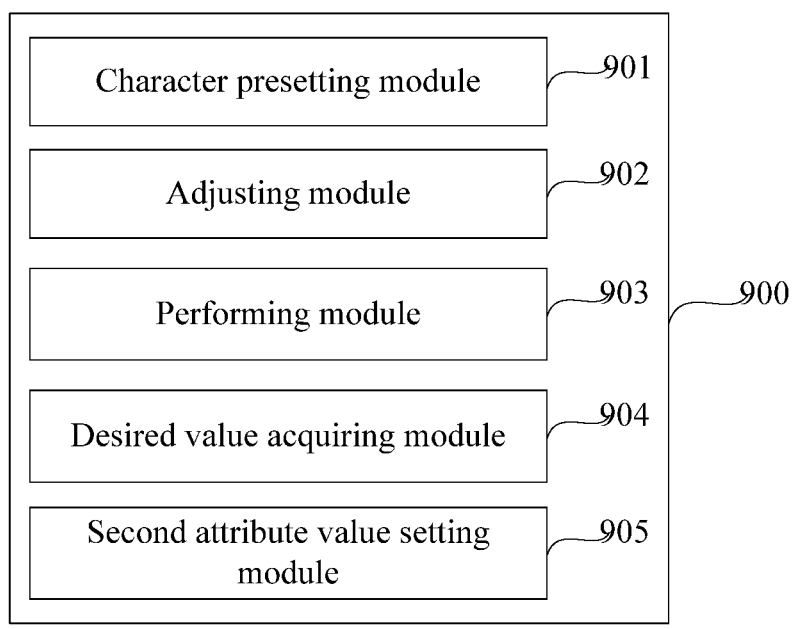
FIG. 12 is a schematic structural diagram of a character setting apparatus according to an embodiment of the present application.

Optionally, as illustrated in FIG. 12, in other embodiments of the apparatus, in addition to the character presetting module 901, the adjusting module 902, the performing module 903 and the desired value acquiring module 904, the apparatus 900 further includes:

a second attribute setting module 905, configured to:

acquire the current character feature;

set the attribute value of the character attribute according to the desired value of the user that is dedicated for the character attribute of the current character feature if the desired value of the user that is dedicated for the character attribute of the current character feature is present; and otherwise, set the attribute value of the character attribute according to the desired value of the user with respect to the character attribute.

It should be noted that the above character setting apparatus may perform the character setting method according to the embodiments of the present application, has corresponding function modules for performing the method, and achieves the corresponding beneficial effects. For technical details that are not illustrated in detail in the embodiments of the character setting apparatus, reference may be made to the description of the character setting method according to the embodiments of the present application.

Figure 13:
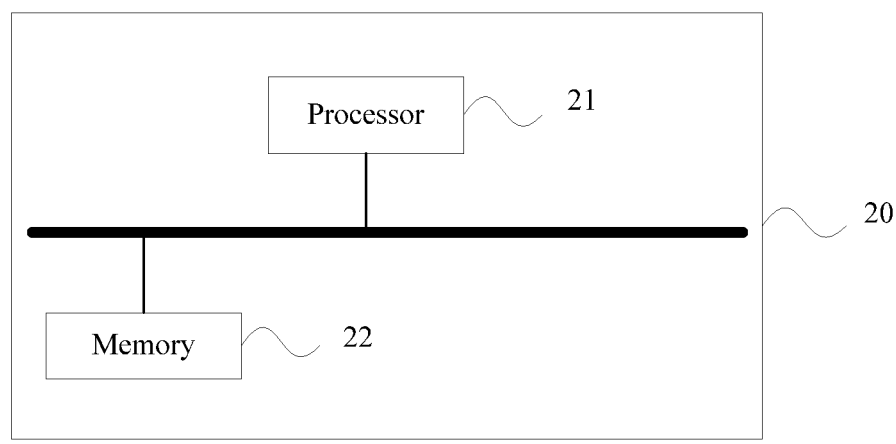
FIG. 13 is a schematic hardware structural diagram of a robot performing the character setting method according to an embodiment of the present application.

FIG. 13 is a schematic hardware structural diagram of a robot 20 performing the method for waking up a robot according to an embodiment of the present application.

As illustrated in FIG. 13, the robot 20 includes: at least one processor 21 and a memory 22, and FIG. 13 uses one processor as an example.

The at least one processor 21 and the memory 22 may be connected via a bus or in another manner, and FIG. 13 uses the bus as an example.

The memory 22, as a non-volatile computer readable storage medium, may be configured to store non-volatile software programs, non-volatile computer executable programs and modules, for example, the program instructions/modules corresponding to the character setting method in the embodiments of the present application (for example, the character presetting module 601, the adjusting module 602 and the performing module 603 as illustrated in FIG. 8). The non-volatile software programs, instructions and modules stored in the memory 22, when being executed, cause the processor 21 to perform various function applications and data processing of a server, that is, performing the character setting method according to the above method embodiments.

The memory 22 may include a program memory area and data memory area, wherein the program memory area may store operation systems and application programs needed by at least function; and the data memory area may store data created according to the usage of the character setting apparatus. In addition, the memory 22 may include a high speed random access memory, or include a non-volatile memory, for example, at least one disk storage device, a flash memory device, or another non-volatile solid storage device. In some embodiments, the memory 22 optionally includes memories remotely configured relative to the processor 21. These memories may be connected to the character setting apparatus over a network. Examples of the above network include, but not limited to, the Internet, Intranet, local area network, mobile communication network and a combination thereof.

One or more modules are stored in the memory 22, and when being executed by the at least one processor 21, perform the character setting method according to any of the above method embodiments, for example, performing steps 101 to 102 in the method as illustrated in FIG. 3, steps 201 to 204 in the method as illustrated in FIG. 4, steps 301 to 305 in the method as illustrated in FIG. 5, steps 401 to 405 in the method as illustrated in FIG. 6; and implementing the functions of the modules 501 to 502 as illustrated in FIG. 7, the modules 601 to 603 as illustrated in FIG. 8, the module 700 and the sub-module 701 as illustrated in FIG. 9, the module 700 and the sub-module 702 as illustrated in FIG. 10, the modules 801 to 806 as illustrated in FIG. 11, and the modules 901 to 905 as illustrated in FIG. 12.

The product may perform the method according to the embodiments of the present application, has corresponding function modules for performing the method, and achieves the corresponding beneficial effects. For technical details that are not illustrated in detail in this embodiment, reference may be made to the description of the methods according to the embodiments of the present application.

An embodiment of the present application provides a non-volatile computer-readable storage medium. The computer readable storage medium stores computer-executable instructions, which, when being executed by at least one processor, for example, the at least one processor 21 as illustrated in FIG. 15, cause the at least one processor to perform the character setting method according to any of the above method embodiments, for example, performing steps 101 to 102 in the method as illustrated in FIG. 3, steps 201 to 204 in the method as illustrated in FIG. 4, steps 301 to 305 in the method as illustrated in FIG. 5, steps 401 to 405 in the method as illustrated in FIG. 6; and implementing the functions of the modules 501 to 502 as illustrated in FIG. 7, the modules 601 to 603 as illustrated in FIG. 8, the module 700 and the sub-module 701 as illustrated in FIG. 9, the module 700 and the sub-module 702 as illustrated in FIG. 10, the modules 801 to 806 as illustrated in FIG. 11, and the modules 901 to 905 as illustrated in FIG. 12.

The above described apparatus embodiments are merely for illustration purpose only. The units which are described as separate components may be physically separated or may be not physically separated, and the components which are illustrated as units may be or may not be physical units, that is, the components may be located in the same position or may be distributed into a plurality of network units. A part or all of the modules may be selected according to the actual needs to achieve the objectives of the technical solutions of the embodiments.

According to the above embodiments of the present application, a person skilled in the art may clearly understand that the embodiments of the present application may be implemented by means of hardware or by means of software plus a necessary general hardware platform. Persons of ordinary skill in the art may understand that all or part of the steps of the methods in the embodiments may be implemented by a program instructing relevant hardware. The program may be stored in a computer-readable storage medium and may be executed by at least one processor. When the program runs, the steps of the methods in the embodiments are performed. The storage medium may be any medium capable of storing program codes, such as read-only memory (ROM), a random access memory (RAM), a magnetic disk, or a compact disc-read only memory (CD-ROM).

Finally, it should be noted that the above embodiments are merely used to illustrate the technical solutions of the present application rather than limiting the technical solutions of the present application. Under the concept of the present application, the technical features of the above embodiments or other different embodiments may be combined, the steps therein may be performed in any sequence, and various variations may be derived in different aspects of the present application, which are not detailed herein for brevity of description. Although the present application is described in detail with reference to the above embodiments, persons of ordinary skill in the art should understand that they may still make modifications to the technical solutions described in the above embodiments, or make equivalent replacements to some of the technical features; however, such modifications or replacements do not cause the essence of the corresponding technical solutions to depart from the spirit and scope of the technical solutions of the embodiments of the present application.

What is claimed is:

1. A robot character setting method, comprising:
   at a robot:
   adjusting an attribute value of at least one character attribute in a preset character feature according to feedback from a user, the character feature comprising a plurality of character attributes, each of the character attributes having an attribute value;
   performing an action or speech according to the attribute value of the character attributes in the current character feature; and
   adjusting the attribute value of the character attribute according to the feedback from the user to acquire a desired value of the user with respect to the character attribute, comprising:
   setting the character feature of the robot as a first character feature within a first time period;

adjusting the attribute value of the character attribute in the first character feature according to the feedback from the user;

setting the character feature of the robot as a second character feature within a second time period;

adjusting the attribute value of the character attribute in the second character feature according to the feedback from the user; and determining the desired value of the user with respect to the character attribute according to the adjustment of the attribute value of the character attribute in the first character feature and the adjustment of the attribute value of the character attribute in the second character feature.

2. The method according to claim 1, further comprising: presetting the character feature;

wherein the step of presetting the character feature comprises:

selecting a character feature from a plurality of predefined character features; and setting the selected character feature as the character feature of the robot.

3. The method according to claim 1, wherein the step of adjusting the attribute value of the character attribute to acquire the desired value of the user with respect to the character attribute comprises:

setting the character feature of the robot as a first character feature within a first time period;

adjusting the attribute value of the character attribute in the first character feature according to the feedback from the user; and recording the attribute value of the character attribute upon completion of the adjustment as the desired value of the user with respect to the character attribute.

4. The method according to claim 1, wherein the step of determining the desired value of the user with respect to the character attribute according to the adjustment of the attribute value of the character attribute in the first character feature and the adjustment of the attribute value of the character attribute in the second character feature comprises:

if the adjustment of the attribute value of the character attribute in the first character feature and the adjustment of the attribute value of the character attribute in the second character feature cause an absolute value of a difference between the attribute value of the character attribute in the first character feature and the attribute value of the character attribute in the second character feature to become smaller, and the absolute value upon completion of the adjustment is less than a preset threshold, recording a value range as the desired value of the user with respect to the character attribute, wherein the value range has two end values, one of the end values is the attribute value of the character attribute in the first character feature upon completion of the adjustment, and the other of the end values the attribute value of the character attribute in the second character feature upon completion of the adjustment.

5. The method according to claim 4, wherein the step of adjusting the attribute value of the character attribute to acquire the desired value of the user with respect to the character attribute further comprises:

broadcasting the desired value of the user with respect to each character attribute;

acquiring a desired value of each character attribute sent by other robots; and if the desired values of different users with respect to the same character attribute have an intersection, taking the intersection as a new desired value of the user with respect to the character attribute.

6. The method according to claim 4, wherein the step of adjusting the attribute value of the character attribute to acquire the desired value of the user with respect to the character attribute further comprises:

if the same character attribute has more than two desired values, and different desired values of the same character attribute have an intersection, taking the intersection as a new desired value of the user with respect to the character attribute.

7. The method according to claim 4, further comprising:

setting the attribute value of the character attribute according to the desired value of the user with respect to the character attribute;

and/or outputting the desired value of the user with respect to the character attribute.

8. The method according to claim 1, wherein the step of determining the desired value of the user with respect to the character attribute according to the adjustment of the attribute value of the character attribute in the first character feature and the adjustment of the attribute value of the character attribute in the second character feature further comprises:

if the adjustment of the attribute value of the character attribute in the first character feature and the adjustment of the attribute value of the character attribute in the second character feature cause an absolute value of a difference between the attribute value of the character attribute in the first character feature and the attribute value of the character attribute in the second character feature to become greater, and the absolute value upon completion of the adjustment is greater than or equal to a preset threshold, recording the attribute value of the character attribute in the first character feature upon completion of the adjustment as the desired value of the user that is dedicated for the character attribute of the first character feature, and recording the attribute value of the character attribute in the second character feature upon completion of the adjustment as the desired value of the user that is dedicated for the character attribute of the second character feature.

9. The method according to claim 8, further comprising:

acquiring the current character feature;

setting the attribute value of the character attribute according to the desired value of the user that is dedicated for the character attribute of the current character feature if the desired value of the user that is dedicated for the character attribute of the current character feature is present; and otherwise, setting the attribute value of the character attribute according to the desired value of the user with respect to the character attribute.

10. The method according to claim 1, wherein the step of adjusting the attribute value of the character attribute according to the feedback from the user comprises:

adjusting the attribute value of the character attribute according to a voice command or conversation content of the user; and adjusting the attribute value of the character attribute according to an instruction from the user.

11. A robot, comprising:

at least one processor; and a memory communicably connected to the at least one processor; wherein the memory stores instructions executable by the at least one processor, wherein, the instructions, when being executed by the at least one processor, cause the at least one processor to perform the method comprising:

adjusting an attribute value of at least one character attribute in a preset character feature according to feedback from a user, the character feature comprising a plurality of character attributes, each of the character attributes having an attribute value;

performing an action or speech according to the attribute value of the character attributes in the current character feature; and adjusting the attribute value of the character attribute according to the feedback from the user to acquire a desired value of the user with respect to the character attribute, comprising:

setting the character feature of the robot as a first character feature within a first time period;

adjusting the attribute value of the character attribute in the first character feature according to the feedback from the user;

setting the character feature of the robot as a second character feature within a second time period;

adjusting the attribute value of the character attribute in the second character feature according to the feedback from the user; and determining the desired value of the user with respect to the character attribute according to the adjustment of the attribute value of the character attribute in the first character feature and the adjustment of the attribute value of the character attribute in the second character feature.

12. A non-volatile computer-readable storage medium, wherein the computer-readable storage medium stores computer-executable instructions, which, when being executed by a robot, cause the robot to perform the method comprising:

adjusting an attribute value of at least one character attribute in a preset character feature according to feedback from a user, the character feature comprising a plurality of character attributes, each of the character attributes having an attribute value; and performing an action or speech according to the attribute value of the character attributes in the current character feature; and adjusting the attribute value of the character attribute according to the feedback from the user to acquire a desired value of the user with respect to the character attribute, comprising:

setting the character feature of the robot as a first character feature within a first time period;

adjusting the attribute value of the character attribute in the first character feature according to the feedback from the user;

setting the character feature of the robot as a second character feature within a second time period;

adjusting the attribute value of the character attribute in the second character feature according to the feedback from the user; and determining the desired value of the user with respect to the character attribute according to the adjustment of the attribute value of the character attribute in the first character feature and the adjustment of the attribute value of the character attribute in the second character feature.

* * * * *